United States Patent
Shi et al.

(10) Patent No.: US 11,204,611 B2
(45) Date of Patent: *Dec. 21, 2021

(54) ASSISTED TAKEOFF

(71) Applicant: SZ DJI TECHNOLOGY CO., LTD., Shenzhen (CN)

(72) Inventors: Jun Shi, Shenzhen (CN); Xu Yang Pan, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 606 days.

This patent is subject to a terminal disclaimer.

(21) Appl. No.: 16/106,652

(22) Filed: Aug. 21, 2018

(65) Prior Publication Data

US 2018/0348793 A1    Dec. 6, 2018

Related U.S. Application Data

(63) Continuation of application No. 14/811,448, filed on Jul. 28, 2015, now Pat. No. 10,061,327, which is a
(Continued)

(51) Int. Cl.
*G05D 1/04* (2006.01)
*B64D 31/06* (2006.01)
(Continued)

(52) U.S. Cl.
CPC ............. *G05D 1/042* (2013.01); *B64D 31/06* (2013.01); *G05B 11/42* (2013.01); *G05D 1/0669* (2013.01);
(Continued)

(58) Field of Classification Search
CPC ......... B64D 31/06; B64C 29/00; B64C 39/00; B64C 2201/024; B64C 2201/108;
(Continued)

(56) References Cited

U.S. PATENT DOCUMENTS 5,152,239 A    10/1992    Hossfield et al.
5,179,905 A    1/1993     Hossfield et al.
(Continued)

FOREIGN PATENT DOCUMENTS

CN    1175017 A      3/1998
CN    102339063 A    2/2012
(Continued)

OTHER PUBLICATIONS

The World Intellectual Property Organization (WIPO) International Preliminary Report on Patentability for PCT/CN2014/074232 dated Sep. 27, 2016.
(Continued)

*Primary Examiner* — Philip J Bonzell
(74) *Attorney, Agent, or Firm* — Anova Law Group, PLLC

(57) ABSTRACT

A method of assisted takeoff of a movable object includes increasing output to an actuator that drives a propulsion unit of the movable object under a first feedback control scheme, determining whether the movable object has met a takeoff threshold, and controlling the output to the actuator using a second feedback control scheme different from the first feedback control scheme in response to the movable object having met the takeoff threshold.

18 Claims, 6 Drawing Sheets

Related U.S. Application Data continuation of application No. 14/257,955, filed on Apr. 21, 2014, now Pat. No. 9,126,693, which is a continuation of application No. PCT/CN2014/074232, filed on Mar. 27, 2014.

(51) Int. Cl.
*G05B 11/42* (2006.01)
*G05D 1/06* (2006.01)
*B64C 29/00* (2006.01)
*B64C 39/02* (2006.01)
*B64C 27/00* (2006.01)

(52) U.S. Cl.
CPC .............. *B64C 27/00* (2013.01); *B64C 29/00* (2013.01); *B64C 39/024* (2013.01); *B64C 2201/024* (2013.01); *B64C 2201/108* (2013.01); *B64C 2201/14* (2013.01)

(58) Field of Classification Search
CPC .. B64C 2201/14; G05D 1/042; G05D 1/0669; G05B 11/42
See application file for complete search history.

(56) References Cited

U.S. PATENT DOCUMENTS

| | | | |
|---|---|---|---|
| 5,331,558 A | | 7/1994 | Hossfield et al. |
| 5,666,110 A | | 9/1997 | Paterson |
| 6,880,784 B1 | | 4/2005 | Wilkinson et al. |
| 7,195,200 B2 | | 3/2007 | Yamane |
| 7,302,316 B2 * | | 11/2007 | Beard ............ G05D 1/101 |
| | | | 701/11 |
| 9,126,693 B1 | | 9/2015 | Shi et al. |
| 9,411,334 B2 * | | 8/2016 | D'Alto ............ B64C 19/00 |
| 2007/0057113 A1 * | | 3/2007 | Parks ............ B64C 29/0041 |
| | | | 244/12.5 |
| 2007/0228221 A1 | | 10/2007 | Segal |
| 2008/0114505 A1 | | 5/2008 | Ishiba |
| 2011/0057075 A1 | | 3/2011 | Hursig et al. |
| 2011/0098967 A1 | | 4/2011 | Khial et al. |
| 2013/0060514 A1 | | 3/2013 | Burke |
| 2013/0082148 A1 * | | 4/2013 | D'Alto ............ B64C 19/00 |
| | | | 244/177 |
| 2013/0126680 A1 | | 5/2013 | Hamke et al. |
| 2013/0184903 A1 | | 7/2013 | Evrard et al. |
| 2013/0325221 A1 | | 12/2013 | Shue |
| 2015/0286216 A1 | | 10/2015 | Miwa |

FOREIGN PATENT DOCUMENTS

| | | |
|---|---|---|
| CN | 102648616 A | 8/2012 |
| CN | 102830622 A | 12/2012 |
| CN | 102915037 A | 2/2013 |
| CN | 102955478 A | 3/2013 |
| CN | 102999142 A | 3/2013 |
| CN | 103359282 A | 10/2013 |
| CN | 103383571 A | 11/2013 |
| CN | 103389732 A | 11/2013 |
| CN | 103466084 A | 12/2013 |
| CN | 103543751 A | 1/2014 |
| EP | 3752634 A1 | 1/1997 |
| EP | 1407965 A1 | 4/2004 |
| GN | 202449208 U | 9/2012 |
| GN | 103383568 A | 11/2013 |
| JP | H1 1115896 A | 4/1999 |
| JP | 2010158350 A | 7/2010 |
| TW | 201041637 A | 12/2010 |
| WO | 2013159480 A1 | 10/2013 |

OTHER PUBLICATIONS

The European Patent Office (EPO) European Search Report and Opinion for EP Application No. 14887273.2 dated Apr. 6, 2016.
The World Intellectual Property Organization (WIPO) International Search Report and Written Opinion for PCT/CN2014/074232 dated Dec. 19, 2014.
The United States Patent and Trademark Office (USPTO) Notice of Allowance for U.S. Appl. No. 14/257,955, dated May 20, 2015.
The United States Patent and Trademark Office (USPTO) Office Action for U.S. Appl. No. 14/257,955, dated Feb. 18, 2015.

* cited by examiner

ASSISTED TAKEOFF

CROSS-REFERENCE

This application is a continuation application of U.S. application Ser. No. 14/811,448, filed on Jul. 28, 2015, which is a continuation application of U.S. application Ser. No. 14/257,955, filed on Apr. 21, 2014, now U.S. Pat. No. 9,126,693, which is a continuation application of International Application No. PCT/CN2014/074232, filed on Mar. 27, 2014, the entire contents of all of which are hereby incorporated by reference.

BACKGROUND OF THE DISCLOSURE

Aerial vehicles such as unmanned aerial vehicles can be used for performing surveillance, reconnaissance, and exploration tasks for military and civilian applications. Such vehicles may carry a payload configured to perform a specific function. These aerial vehicles may take off and land on a surface.

However, when traditionally controlled aerial vehicles take off from a surface, the feedback control systems used combined with the force provided by the surface can cause initial instability. Particularly, when a surface is sloped, the takeoff may not be vertical, and there may be a greater probability of crashing or falling over. The takeoff often presents a challenge for users, particularly inexperienced users, and if the aircraft is uncontrolled or unstable during takeoff, users will become nervous and cause the aircraft to crash.

SUMMARY OF THE DISCLOSURE

In some instances, it may be desirable to use takeoff methods which may permit an aerial vehicle takeoff to be substantially smooth and vertical. Thus, a need exists for improved takeoff methods. The present disclosure provides systems, methods, and devices related to takeoff controls for the aerial vehicle. Existing proportional-integral-derivative (PID) controllers, due to memory effects of integration, will result in a ground force, which may cause the integration expression to be wrong and cause instability. The disclosure permits the elimination of integration during takeoff, until the aerial vehicle is determined to have left the ground. Control systems and methods described herein may directly output analog takeoff control values, and after successful takeoff, seamlessly switch to a PID control. The determination may be made when to switch to a PID control scheme based on an output to one or more motors of the aerial vehicle and/or an acceleration of the aerial vehicle.

An aspect of the disclosure is directed to a method of assisted takeoff of a movable object, said method comprising: increasing output to an actuator of the movable object under a first control scheme, wherein the output to the actuator results in the increase of an altitude of the movable object; determining, with aid of a processor, whether the movable object has met a takeoff threshold based on the output to the actuator, the output measured from an actuator, or velocity or acceleration of the movable object; and controlling the output to the actuator using a second control scheme when the movable object has met the takeoff threshold.

In some embodiments, the movable object may be an aircraft capable of vertically taking off and/or landing. The movable object may be an unmanned aerial vehicle. The unmanned aerial vehicle may be a rotorcraft. The actuator may be a motor driving a propulsion unit of the movable object. The propulsion unit may be a rotor configured to provide lift to the movable object.

The first control scheme may be a first integral control scheme. An integral value under the first integral control scheme may be set to a default value. In some implementations, the default value may be zero.

The output may be increased by a constant value. Increasing the output to the actuator may result in increasing overall propulsion of the movable object. The command may be provided by a remote terminal. Prior to receiving the command to increase the altitude of the movable object, a command may be received to start the actuator and placing the actuator in an idle mode. The method may also include reducing the output to the actuator until the actuator is in an idle mode when the command to increase the altitude does not exceed a predetermined value.

Optionally, the second control scheme may be a second integral control scheme. Controlling the output to the actuator using the second integral control scheme may include integral control of the vertical direction. Controlling the output to the actuator using the second integral control scheme may include integral control over one or more of the following: front direction, rear direction, right direction, left direction, or attitude. In some cases, controlling the output to the actuator using the second integral control scheme may include using a proportional-integral-derivative control scheme.

Determining whether the movable object has met the takeoff threshold may be based on the degree of output to the actuator. Determining whether the movable object has met the takeoff threshold based on the degree of the output to the actuator may include determining that the movable object has met the takeoff threshold when the degree of the output to the actuator exceeds a predetermined output value. Determining whether the movable object has met the takeoff threshold may also be based on a measured velocity or acceleration of the movable object, measured altitude, or output measured from the actuator. Optionally, determining whether the movable object has met the takeoff threshold does not depend on signals received from a source external to the movable object.

In some instances, the takeoff threshold is met when (1) the output to the actuator is greater than a first predetermined output value and acceleration of the movable object in a vertical direction exceeds a predetermined acceleration value, or (2) the output the actuator is greater than a second predetermined output value. The second predetermined output value may be different from the first predetermined output value. The second predetermined output value may be greater than the first predetermined output value.

Another aspect of the disclosure may be directed to a system for assisted takeoff of a movable object, said system comprising: a receiver configured to receive a command to increase an altitude of the movable object; an actuator of the movable object, wherein the output to the actuator results in the increase of the altitude of the movable object; and a processor configured to determine whether the movable object has met a takeoff threshold based on the output to the actuator, output measured from the actuator, or velocity or acceleration of the movable object, and generate a signal used to control the output to the actuator (1) using a first control scheme when the movable object has not met the takeoff threshold, and (2) using a second control scheme when the movable object has met the takeoff threshold.

The processor may be on-board the movable object. Alternatively, the processor may be provided on an external device separate from the movable object.

In some embodiments, the movable object may be an aircraft capable of vertically taking off and/or landing. The movable object may be an unmanned aerial vehicle. The unmanned aerial vehicle may be a rotorcraft. The actuator may be a motor driving a propulsion unit of the movable object. The propulsion unit may be a rotor configured to provide lift to the movable object.

The first control scheme may be a first integral control scheme. An integral value under the first integral control scheme may be set to a default value. In some implementations, the default value may be zero.

The output may be increased by a constant value. Increasing the output to the actuator may result in increasing overall propulsion of the movable object. The command may be provided by a remote terminal. The receiver may be configured to receive a command to start the actuator and place the actuator in an idle mode, prior to receiving the command to increase the altitude of the movable object. The output to the actuator may be reduced until the actuator is in an idle mode when the command to increase the altitude does not exceed a predetermined value.

The second control scheme may be a second integral control scheme. The second integral control scheme may include integral control of the vertical direction. The second integral control scheme may include integral control over one or more of the following: front direction, rear direction, right direction, left direction, or attitude. The second integral control scheme may include a proportional-integral-derivative control scheme.

The processor may determine that the movable object has met the takeoff threshold when the degree of the output to the actuator exceeds a predetermined output value. In some implementations, the processor determines whether the movable object has met the takeoff threshold based on a measured velocity or acceleration, measured altitude, or measured output from the actuator of the movable object. The processor may determine whether the movable object has met the takeoff threshold without relying on signals received from a source external to the movable object.

In some embodiments, the takeoff threshold is met when (1) the output to the actuator is greater than a first predetermined output value and acceleration of the movable object in a vertical direction exceeds a predetermined acceleration value, or (2) the output the actuator is greater than a second predetermined output value. The second predetermined output value may be different from the first predetermined output value. The second predetermined output value may be greater than the first predetermined output value.

A method of assisted takeoff of a movable object may be provided in accordance with another aspect of the disclosure. The method may comprise: increasing output to an actuator of the movable object under a first control scheme; determining, with aid of a processor, whether (1) the output to the actuator is greater than a first predetermined output value and when acceleration of the movable object in a vertical direction exceeds a predetermined acceleration value, or (2) the output to the actuator is greater than a second predetermined output value; and controlling the output to the actuator by using a second control scheme different from the first control scheme when (1) the output to the actuator is greater than a first predetermined output value and when acceleration of the movable object in a vertical direction exceeds a predetermined acceleration value, or (2) the output to the actuator is greater than a second predetermined output value.

In some embodiments, the movable object may be an aircraft capable of vertically taking off and/or landing. The movable object may be an unmanned aerial vehicle. The unmanned aerial vehicle may be a rotorcraft. The actuator may be a motor driving a propulsion unit of the movable object. The propulsion unit may be a rotor configured to provide lift to the movable object.

The output may be increased by a constant value. Increasing the output to the actuator may result in increasing overall propulsion of the movable object. The method may also include receiving a command to increase an altitude of the movable object. The command may be provided by a remote terminal. Prior to receiving the command to increase an altitude of the movable object, a command may be received to start the actuator and placing the actuator in an idle mode. The method may include reducing the output to the actuator until the actuator is in an idle mode when the command to increase the altitude does not exceed a predetermined value.

The first control scheme may use an integral value that is set to a default value. The default value may be zero. The second control scheme may use integral control of the vertical direction. Controlling the output to the actuator using integral control may includes integral control over one or more of the following: front direction, rear direction, right direction, left direction, or attitude. Controlling the output to the actuator by using the second control scheme may include using a proportional-integral-derivative control scheme.

The second predetermined output value may be different from the first predetermined output value. Optionally, the second predetermined output value is greater than the first predetermined output value.

Furthermore, an aspect of the disclosure may include a system for assisted takeoff of a movable object, said system comprising: an actuator of the movable object; and a processor configured to determine when one or more of the following conditions are met: (1) an output to the actuator is greater than a first predetermined output value and when acceleration of the movable object in a vertical direction exceeds a predetermined acceleration value, or (2) the output to the actuator is greater than a second predetermined output value, and generate a signal used to control the output to the actuator (a) by using a first control scheme when neither of the conditions (1) or (2) met, and (b) by using a second control scheme when at least one of the conditions (1) or (2) are met.

The processor may be on-board the movable object. Alternatively, the processor may be provided on an external device separate from the movable object.

Optionally, the movable object may be an aircraft capable of vertically taking off and/or landing. The movable object may be an unmanned aerial vehicle. The unmanned aerial vehicle may be a rotorcraft. The actuator may be a motor driving a propulsion unit of the movable object. The propulsion unit may be a rotor configured to provide lift to the movable object.

The output may be increased by a constant value. Increasing the output to the actuator may result in increasing overall propulsion of the movable object. A receiver may be provided that is configured to receive a command to increase an altitude of the movable object. The command may be provided by a remote terminal. The receiver may be configured to receive a command to start the actuator and placing the actuator in an idle mode, prior to receiving the command to increase an altitude of the movable object. The output to the actuator may be reduced until the actuator is in an idle mode when the command to increase the altitude does not exceed a predetermined value.

In some embodiments, the first control scheme may use an integral value that is set to a default value. The default value may be zero. The second control scheme may use integral control of the vertical direction. Controlling the output to the actuator using integral control may includes integral control over one or more of the following: front direction, rear direction, right direction, left direction, or attitude. Controlling the output to the actuator by using the second control scheme may include using a proportional-integral-derivative control scheme.

The second predetermined output value may be different from the first predetermined output value. Optionally, the second predetermined output value is greater than the first predetermined output value.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION OF THE DISCLOSURE

The systems, devices, and methods of the present disclosure provide assisted takeoff for an aerial vehicle from a surface, which enables improved control for a user. The aerial vehicle may be an unmanned aerial vehicle (UAV), or any other type of movable object. Oftentimes, a feedback control is used during flight of an aerial vehicle. During normal flight operations, a proportional-integral-derivative (PID) flight control system is often used. However, during takeoff, memory effects of integration combined with ground forces may cause the meaning of the integration expression to go wrong. This can cause instability during takeoff and may require complex maneuvers that many novice users may not be familiar or comfortable with. This can lead to crashing of the UAV during takeoff.

An assisted takeoff system, method, and device may be provided which may reduce this instability during takeoff and permit novice users to easily control the aerial vehicle during takeoff. While the aerial vehicle is taking off, the integral calculation may be removed from the feedback control. This permits direct output of analog takeoff control values. After it has been determined that the aerial vehicle has successfully taken off (i.e., the aircraft is in mid-air), the feedback control scheme may be switched to normal flight mode, which may include integral control (e.g., PID control).

The switch from one feedback control scheme to another may be made when it is determined that a takeoff threshold has been met. This may be determined based on information that is provided from on-board the aerial vehicle. For instance, the takeoff threshold may be deemed to be met based on information regarding output to a motor of the aerial vehicle, and/or acceleration of the aerial vehicle. For instance, the takeoff threshold may be met when at least one of the following conditions is met: (1) output to the motor exceeds a first threshold output value and vertical acceleration of the aerial vehicle exceeds a threshold acceleration value, or (2) output to the motor exceeds a second threshold output value. Thus, the switch in the flight control scheme may be made from a takeoff control scheme to a normal flight control scheme when the takeoff threshold is met, indicative of when the aircraft has fully taken off from the surface, and it is safe to switch to the normal flight control. In some instances, the switch may be made without requiring any signals from outside the aerial vehicle. The aerial vehicle may be self-contained in making the determination of when to make the switch in control schemes.

Figure 1:
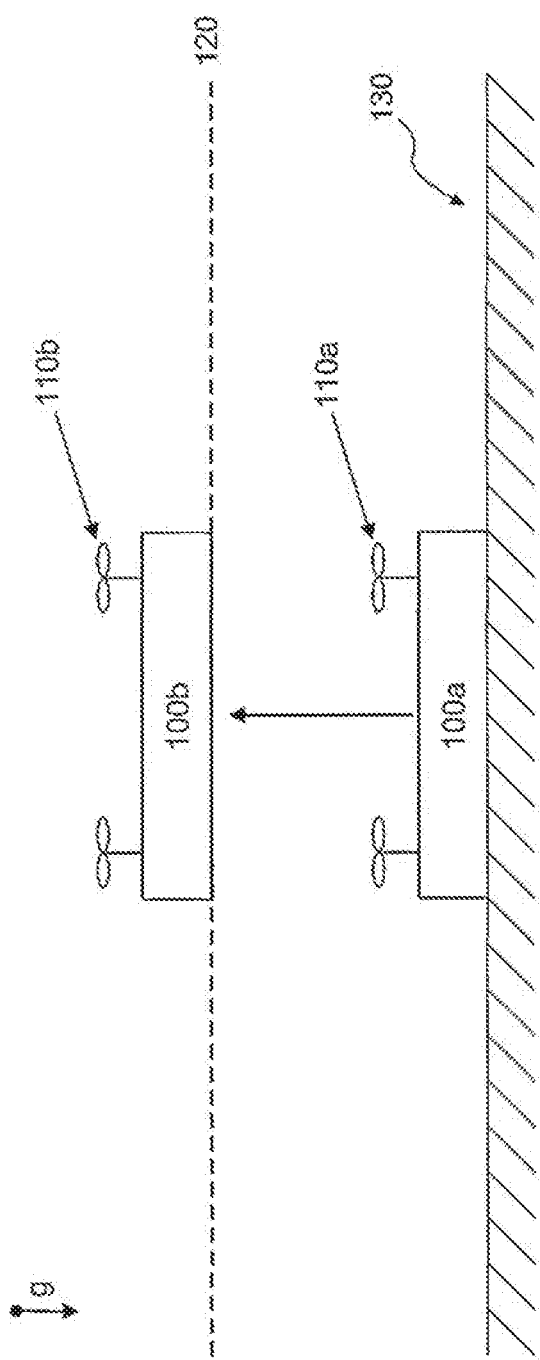
FIG. 1 illustrates an aerial vehicle taking off, in accordance with an embodiment of the disclosure.

FIG. 1 illustrates an aerial vehicle 100 taking off, in accordance with an embodiment of the disclosure. The aerial vehicle 100a may initially be resting on a surface 130 prior to takeoff. The aerial vehicle may include one or more propulsion units 110a. The propulsion units may provide lift to the aerial vehicle. When the aerial vehicle receives a command to take off, it may lift off of the surface under a first control scheme. When the aerial vehicle 100b meets a threshold 120 indicative of whether the aerial vehicle has sufficiently taken off, the aerial vehicle may switch over to a second control scheme. The propulsion units 110b of the aerial vehicle may then be controlled on the second control scheme, which may be different from the first control scheme.

In some embodiments, the aerial vehicle 100a, 100b may be a UAV, or any other type of movable object. The aerial vehicle may be a rotorcraft. The aerial vehicle may have propulsion units 110a, 110b that may be capable of causing the aerial vehicle to move. The propulsion units may provide lift to the aerial vehicle and permit the aerial vehicle to change altitude. The propulsion units may also cause the aerial vehicle to move laterally and/or change orientation. The position of the aerial vehicle may be controlled (e.g., altered or maintained) by the propulsion units. The propulsion units may control the aerial vehicle with respect to one or more degrees of freedom (e.g., e.g., 1-3 degrees of spatial disposition, 1-3 degrees of orientation).

The propulsion units 110a, 110b may be rotors that may be rotated to provide lift to the aerial vehicle. The rotors may include one or more rotor blades that may spin about an axis. In some instances, a single propulsion unit may be provided on an aerial vehicle. Alternatively, multiple propulsion units may be provided for an aerial vehicle. For example, one, two, three, four, five, six, seven, eight, nine, ten or more propulsion units may be provided on an aerial vehicle. The propulsion units may be driven by one or more actuators. The actuators may be motors, such as AC or DC motors. The actuators may respond to a command signal from a flight controller. The command signal may include output to the actuators. In some embodiments, each propulsion unit may be driven by a single actuator. Optionally, an actuator may drive multiple propulsion units, or a single propulsion unit may be driven by multiple actuators.

Initially, prior to taking off, the aerial vehicle 100a may be supported by a surface 130. The surface may be a ground, structure, street, turf, water, movable object, living being, or any type of support. In some instances the surface may be static. For example, the surface may not be moving to a reference frame, such as the environment. In some implementations, the surface may be moving or movable relative to a reference frame, such as the environment. The surface may or may not change altitude or orientation.

In some embodiments, the surface 130 may be substantially flat. When the aerial vehicle is resting on the surface, a takeoff axis may be substantially parallel to the direction of gravity g. In other embodiments, the surface may be sloped. For example, when the vehicle is resting on the surface, a takeoff axis may be at an angle relative to the direction of gravity. For example, the angle may be greater than or equal to about 5 degrees, 10 degrees, 15 degrees, 30 degrees, 45 degrees or 60 degrees. In some instances, the angle may be less than or equal to about 5 degrees, 10 degrees, 15 degrees, 30 degrees, 45 degrees or 60 degrees.

The aerial vehicle 100a may receive a command to take off, and a flight controller may control the flight under a first control scheme before a takeoff threshold 120 is met, and may control the flight under a second control scheme after the takeoff threshold is met. The takeoff threshold may be indicative of when the aerial vehicle has fully taken off so that the vehicle can utilize a proportional integral derivative (PID) flight without the detrimental effects described elsewhere herein. Prior to the takeoff threshold being met, the aerial vehicle may be in a takeoff phase. After the takeoff threshold has been met, the aerial vehicle may be in a flight phase. Thus a two-stage process may be provided when the aerial vehicle takes off. The takeoff phase may use the first control scheme. The flight phase may use the second control scheme.

In some instances, the first control scheme may be a control scheme where an integral value is set to a default value. For example, the default value may be zero, or another default value. In some alternative implementations, the first control scheme does not use integral control. The second control scheme may be a control scheme that does use integral control. In one example, the first control scheme may use proportional-derivative (PD) control, or proportional-integral-derivative (PID) control where the integral value may be set to a default value, such as zero. The second control scheme may use proportional-integral-derivative (PID) control. In some embodiments, the first control scheme may have a PID setup where the integral output is always zero. The second control scheme may permit the integral output to be turned on. This may be applicable for both altitude and attitude control. For example, during a takeoff phase, both the altitude and attitude control may have an integral value set to a default value, such as zero. Alternatively, only one of the altitude or attitude control may have an integral value set to a default value, such as zero. During a flight phase, both the altitude and attitude control may use normal integral control.

The first control scheme may have an integral control scheme where the integral value is set to zero, or other default value, in the vertical direction of the aircraft. The first control scheme may optionally have an integral value set to zero, or other default value, in the lateral directions of the aircraft. The second control scheme may use integral control in the vertical direction of the aircraft. The second control scheme may use integral control in the lateral directions of the aircraft. Optionally, the first control scheme may result in the use of PD control for both vertical and lateral directions of the aircraft. The first control scheme may use PD control or PID control for attitude control of the aircraft. Optionally, the second control scheme may result in the use of PID control for both the vertical and lateral directions of the aircraft. The second control scheme may use PID control for attitude control of the aircraft. In some instances, a flight control scheme may have an integral control that is $I_{out}=K_i\int_0^i \in(\tau)d\tau$. In one example, the first integral control scheme may keep $I_{out}$ as a default value (e.g., constant numerical value). In some examples, $I_{out}$ may be kept at zero. In some instances, $I_{out}$ may be kept as the same value. In some instances, $I_{out}$ may vary by a small amount. In some instances, $I_{out}$ may vary in a predetermined manner. Optionally $K_i$ may be set to zero. In some instances, the first integral control scheme may be implemented while the aircraft is in a take-off phase. A second integral control scheme different from the first integral control scheme may be implemented while the aircraft is in a flight phase. Normal integral control may be used.

In some embodiments, the control scheme that dictates flight may be determined by a flight controller of an aerial vehicle 100a, 100b. The flight controller may output one or more command signals in response to the control scheme being used. The command signals may be provided to one or more actuators that drive the propulsion units of the aerial vehicle.

The flight controller may determine which control scheme to use depending on whether a takeoff threshold 120 has been reached. The flight controller may make the determination whether the takeoff threshold has been reached based on one or more sensed condition or data from one or more sensors. In some instances, a separate processor (on-board or off-board the aerial vehicle) may be used to determine whether the takeoff threshold has been met. The separate processor may provide a signal to the flight controller indicative of whether the takeoff threshold has been met. In some instances, once the flight controller has determined which control scheme to use, it may calculate output to the motors under the selected control scheme.

Two different flight control schemes may be used, depending on the phase of a two-stage takeoff process. In various alternative implementations, any number of flight control schemes may be provided for a takeoff process that may have any number of stages. For example, three flight control schemes, four flight control schemes, five flight control schemes, six flight control schemes or more control schemes may be used for multi-stage take off processes having three, four, five, six or more phases. Any description herein of a two-control scheme system may apply to any type of multi-control scheme system. Multi-control scheme systems may have different threshold points indicating different points in the takeoff process. The methods described herein to determine when a takeoff threshold has been met may be applied to any number of threshold points.

FIG. 1 shows how after a takeoff threshold 120 has been met, the aerial vehicle 100b may be clear of the surface 130 and may be ready to switch to a standard flight mode (e.g., PID control). In some instances, the takeoff threshold may be related to an altitude of the aerial vehicle, velocity of the aerial vehicle, acceleration of the aerial vehicle, output to an actuator of an aerial vehicle, output measured from an actuator of an aerial vehicle, or any other characteristic of the aerial vehicle.

Figure 2:
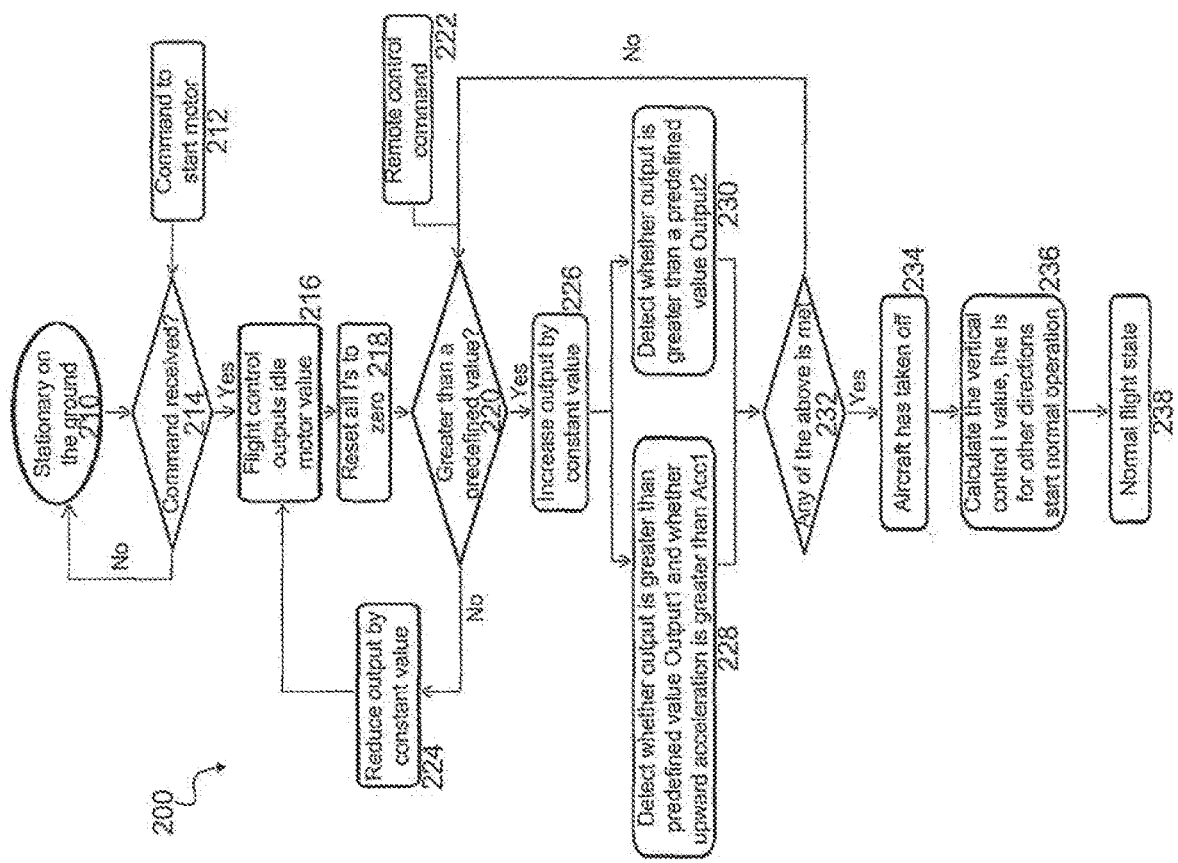
FIG. 2 illustrates an example of a method for controlling takeoff of an aerial vehicle, in accordance with an embodiment of the disclosure.

FIG. 2 illustrates an example of a method for controlling takeoff of an aerial vehicle, in accordance with an embodiment of the disclosure.

Initially, an aerial vehicle may be stationary on a surface 210, such as the ground. This may be prior to starting any motors of the aerial vehicle. Any description herein of a motor of the aerial vehicle may apply to any number of motors of the aerial vehicle, or any other types of actuator of the aerial vehicle that may be used to drive a propulsion unit.

A command may be received to start one or more motors of the aerial vehicle 212. The command may be received from a terminal remote to the aerial vehicle. For example, a user may select an option on a remote controller to start a motor of the aerial vehicle. In some instances, the remote controller may be a smartphone, tablet, joystick, wearable object (e.g., glasses, gloves, helmet, wristband), or any other type of terminal as described in greater detail elsewhere herein. Alternatively, the command may be received from a terminal local to the aerial vehicle or built into the aerial vehicle. For example, a user may turn on a power switch or select an 'on' button to turn on the aerial vehicle and start a motor. In some instances, the command may be generated by a user remote to the aerial vehicle. Alternatively, the command may be provided by a user on-board the aerial vehicle.

The aerial vehicle may determine whether it has received a command to start a motor 214. If it has not yet received a command, the vehicle may remain stationary on the surface. If it has received a command, a flight controller may output an idle motor value 216. In some embodiments, an aerial vehicle motor may be in idle mode so that the motor is running without causing any actuation of a propulsion unit. The motor may be running in idle mode without any loads except engine accessories.

The integral output (I) may be set to zero 218. The integral output may be set to zero once the flight control outputs an idle motor value 216. In some instances, the integral output may be set to zero when it has been determined that a command has been received to start a motor 214. The integral output may be set to zero while the aerial vehicle is still on the surface (e.g., prior to taking off). The integral output may be set to zero in all directions (e.g., vertical, left/right, forward/backward, heading angle). The I value may be cleared in all directions. In some other instances, the I value may be set to a default value, such as a constant numerical value.

A flight control command may be provided 222. In some instances, the flight control may be generated by a user. The user may use a remote terminal, such as that described elsewhere herein. The same remote terminal may be used to provide a command to start a motor 212 and provide flight controls 222. Alternatively, the user may control the flight via one or more controls local to the aerial vehicle or built-into the aerial vehicle. The flight control commands may be used to control position of the aerial vehicle. The flight control commands received may be provided to a flight controller on-board the aircraft, which may generate one or more signals for the operation of the motor. The motor may in turn drive one or more propulsion units, such as a rotor blade, of the aerial vehicle.

If the flight control command 222 is greater than a predetermined value 220, output to the motor may be increased. The output to the motor may be increased by a constant value 226. If the flight control command is less than a predetermined value, then the output to the motor may be reduced. In some instances, the output to the motor may be reduced by a constant value 224 until the motor is running in idle mode 216. In some instances, it may be determined whether the vertical speed of the aerial vehicle is greater than a predetermined value 220, in which case the output to the motor is increased, for example by a constant value 226. If the vertical speed of the aerial vehicle is less than a predetermined value 220, the output to the motor may be decreased, for example at a constant value 224, until the motor is running in idle mode 216.

While the predetermined value 220 is exceeded (e.g., for vertical speed of the aerial vehicle) and the output to the motor is being increased, the aerial vehicle may be increasing its altitude relative to the surface. Thus the aerial vehicle may be rising from the surface. In some instances, the aerial vehicle may be accelerating or decelerating while rising. Alternatively, the aerial vehicle may be rising at a constant velocity.

An output to a motor of the aerial vehicle may be determined while the aerial vehicle is rising. In some instances, the output to the motor may be known based on command signals from a flight controller that may dictate the output to the motor. In another example, the output to the motor may be measured using one or more sensor. The output to the motor may be indicative of the output to the motor to provide a particular altitude. For instance, in some embodiments, it may be known what output needs to be provided to a motor for that type of aerial vehicle to reach a particular altitude. The output to the motor may be provided as a power output to the motor. The degree, intensity, or level of the output to the motor may be calculated or measured. In some embodiments, an aerial vehicle may have multiple motors. Output to the motor may refer to output to a single motor, average output to multiple motors, or total aggregated output to the multiple motors.

The system may detect whether the output to the motor exceeds a predefined output value. In some instances, the system may also detect the upward acceleration of the aerial vehicle. The system may detect whether the upward acceleration is greater than a predefined acceleration value. In one example, the system may detect whether the output to the motor is greater than a first predefined output value (Output1) and whether the upward acceleration of the aerial vehicle is greater than the predefined acceleration value (Acc1). If both these conditions are met 232 then it may be determined that a takeoff threshold has been met and the aircraft has taken off 234.

The system may detect whether the motor is greater than a second predefined output value (Output 2). If this condition is met 232 then it may be determined that a takeoff threshold has been met and the aircraft has taken off 234.

It may be determined whether either of the takeoff conditions has been met. For example, it may be determined whether at least one of the conditions have been met (1) output is greater than Output1 and upward acceleration is greater than Acc1, or (2) output is greater than Output2. If at least one of (1) or (2) has been met 232 then it may be determined that a takeoff threshold has been met and the aircraft has taken off 234. In some embodiments, a second predefined output value Output2 may have a different value than a first predefined output value Output 1. For example, a second predefined output value Output2 may be greater than a first predefined output value Output1. The second condition (2) may be provided to make sure that the aerial vehicle has taken off, even if detection of the first condition (1) has failed. For example, even if detection of Output1 has failed, or Acc1 has failed, detection of Output2 may be provided to detect if the aircraft has taken off. In some embodiments, condition (1) will typically be met before condition (2). Alternatively, in some instances, condition (2) may be met prior to detection of condition (1) being met.

After it is determined that an aircraft has taken off 234, the integral control I may be calculated. Thus, normal integral control may be permitted after it is determined that an aircraft has taken off. A PID control scheme may be used. The integral control may be calculated in the vertical direction. The integral may also be calculated for other directions (e.g., right/left, forwards/backwards, heading angle). The aerial vehicle may then be operating in a normal flight state 238 which includes integral control.

The process may include controlling flight of an aircraft under a first control scheme prior to detecting whether a takeoff threshold is met, and controlling flight of the aircraft under a second control scheme after detecting the takeoff threshold is met. The first control scheme may use an integral control scheme where an integral output is zero (or other default value), while the second control scheme may use a normal integral control scheme, where the integral output may be calculated. The first control scheme may be in effect up to step 226. In some instances, a first control scheme is in effect once the command is received to start the motor, up to when it is determined that a takeoff threshold is met (e.g., which may occur at steps 232, 234). The second control scheme may be in effect after 234 (e.g., from 236 onwards). In some instances, the second control scheme is in effect once it is determined that the aircraft has taken off 236.

In some instances, one or more of the steps described 228, 230, 232 may be used to determine whether a takeoff threshold is met. It may be determined whether a takeoff threshold is met based on an output value to one or motors of the aerial vehicle. For instance, based on an amount of power output to one or more motors, whether a takeoff threshold is met may be determined. In some instances, it may be determined whether a takeoff threshold is met based on an acceleration of the aerial vehicle. In alternate embodiments, other information about the aerial vehicle, such as velocity or positional information may be used to determine whether a threshold has been met.

The systems and methods described herein may advantageously permit the aerial vehicle to determine whether a takeoff threshold has been met without requiring any signals received from a source external to the aerial vehicle. For example, the aerial vehicle need not receive any signals from external devices, such as global positioning system (GPS) satellites, towers, other aerial vehicles, remote terminals, in determining whether a takeoff threshold has been met. The aerial vehicles also need not receive any signals from objects (e.g., signals that are pinged back from ultrasonic sensors on-board the aerial vehicle, or any other type of sensor that requires a signal back). Any sensors used in the determination of whether the takeoff threshold has been met may be provided on-board the aerial vehicle and use information that is detectable on-board the aerial vehicle. Thus, signals used to determine whether a takeoff threshold has been met may be generated from sensors that are self-contained within the aerial vehicle and need not interact with an environment around the aerial vehicle.

The aerial vehicle may determine whether a takeoff threshold has been met based on one or more signals from an inertial measurement unit (IMU). An IMU can include one or more accelerometers, one or more gyroscopes, one or more magnetometers, or suitable combinations thereof. For example, the IMU can include up to three orthogonal accelerometers to measure linear acceleration of the movable object along up to three axes of translation, and up to three orthogonal gyroscopes to measure the angular acceleration about up to three axes of rotation. The IMU can be rigidly coupled to the aerial vehicle such that the motion of the aerial vehicle corresponds to motion of the IMU. Alternatively the IMU can be permitted to move relative to the aerial vehicle with respect to up to six degrees of freedom. The IMU can be directly mounted onto the aerial vehicle, or coupled to a support structure mounted onto the aerial vehicle. The IMU may be provided exterior to or within a housing of the movable object. The IMU may be permanently or removably attached to the movable object. In some embodiments, the IMU can be an element of a payload of the aerial vehicle. The IMU can provide a signal indicative of the motion of the aerial vehicle, such as a position, orientation, velocity, and/or acceleration of the aerial vehicle (e.g., with respect to one, two, or three axes of translation, and/or one, two, or three axes of rotation). For example, the IMU can sense a signal representative of the acceleration of the aerial vehicle, and the signal can be integrated once to provide velocity information, and twice to provide location and/or orientation information. The IMU may be able to determine the acceleration, velocity, and/or location/orientation of the aerial vehicle without interacting with any external environmental factors or receiving any signals from outside the aerial vehicle.

An IMU may provide a signal about acceleration of the aerial vehicle that may be used to determine whether a takeoff threshold has been met. The signal about the acceleration of the aerial vehicle may be compared to a threshold acceleration value Acc1. In alternative embodiments, information comparing velocity information to a velocity threshold and/or position information to a position threshold may be used.

An aerial vehicle may also be able to determine whether a takeoff threshold is met based on an output value to one or motors of the aerial vehicle. For instance, based on an amount of power output to one or more motors, whether a takeoff threshold is met may be determined. In some instances, a sensor may be provided to measure the amount of output to one or more motors. The sensor may be provided on-board the aerial vehicle and/or within an aerial vehicle housing. Alternatively, the amount of output to one or more motors may be determined based on a command signal generated by a flight controller. The output to one or more motors may be calculated based on a desired degree of output that is calculated by the flight controller and used to generate the command signal that drives the motors. In some embodiments, a measured output from the motors may be used to calculate an output to the motors or to determine a takeoff threshold of the aerial vehicle.

In some embodiments, the output to the motors may be combined with the acceleration of the aerial vehicle or any other positional information of the aerial vehicle to determine whether a takeoff threshold has been met. The takeoff threshold may be when the aerial vehicle switches between control schemes. Thus, the output to a motor may be combined with acceleration of the aerial vehicle or considered on its own to determine when to switch from a first control scheme to a second control scheme.

Figure 3:
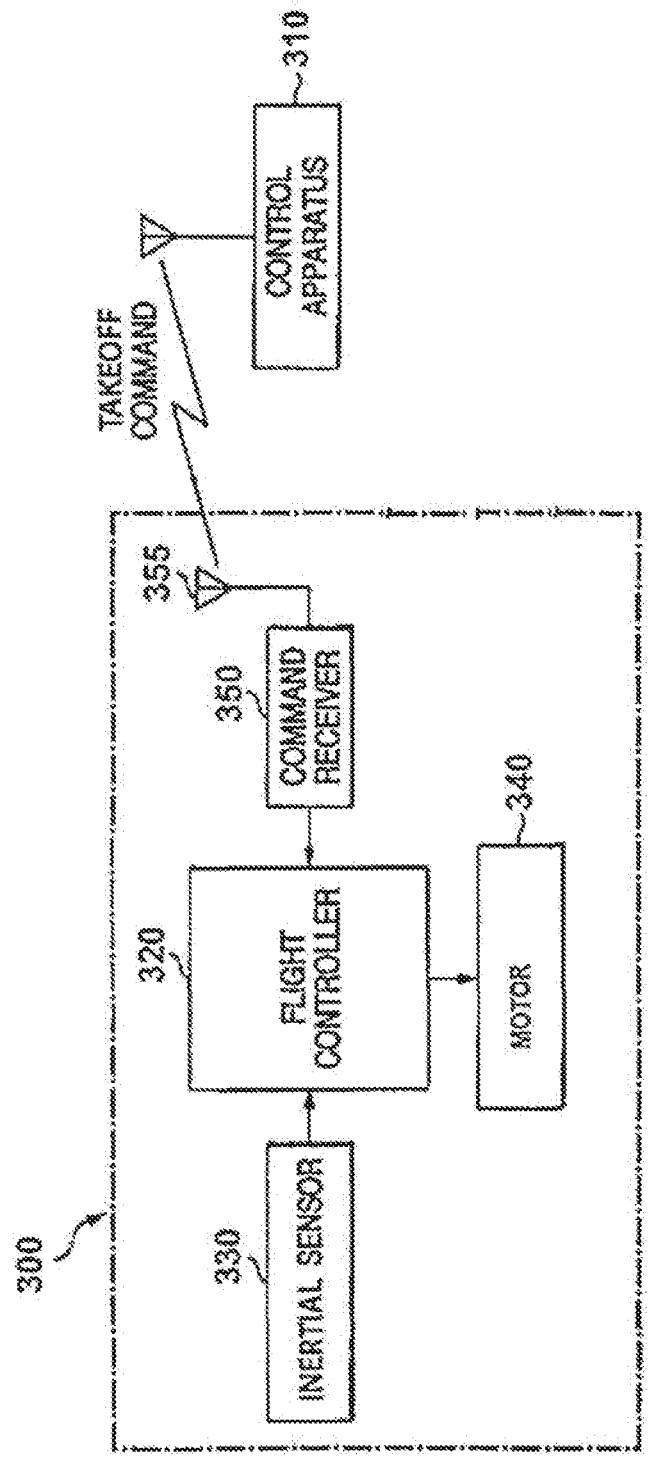
FIG. 3 provides a high level schematic of an aerial vehicle, in accordance with an embodiment of the disclosure.

FIG. 3 provides a high level schematic of an aerial vehicle, in accordance with an embodiment of the disclosure. An aerial vehicle 300 may be in communication with a control apparatus 310. In some instances, the control apparatus may be remote terminal, examples of which are provided in greater detail elsewhere herein. The aerial vehicle may include a flight controller 320, inertial sensor 330, motor 340, command receiver 350 which may include an antenna 355.

The aerial vehicle 300 may be a UAV. The aerial vehicle may be configured to take off and land without a human on-board. The aerial vehicle may communicate with a control apparatus 310. In some embodiments, wireless communications may be used. Any form of communication, such as those described in greater detail elsewhere herein, may be used. In some embodiments, a control apparatus may send a signal to the aerial vehicle to control operation of the aerial vehicle. The control apparatus may send a signal to control flight of the aerial vehicle, such as takeoff, landing, and/or flight maneuvering. The control apparatus may send a signal that controls the position of the aerial vehicle (e.g., location (along one, two, or three axes), orientation (along one, two, or three axes)). The control apparatus may send a flight control signal which may result in control of one or more motors of the aerial vehicle that controls propulsion units of the aerial vehicle, and results in control of the flight position of the aerial vehicle. The control apparatus may send a signal to control other aspects of operation of the aerial vehicle. For example, the control apparatus may send a signal that controls positioning of a payload on an aerial vehicle, or operation of the payload. The control apparatus may also send signals that control the type of information sensed by the aerial vehicle. The control apparatus may optionally send a signal that instructs the aerial vehicle to turn on (e.g., power up) or turn off (e.g., power down).

The control apparatus 310 may have an antenna that may communicate with an antenna 355 of a command receiver 350 on the aerial vehicle 300. Any form of transceivers may be used between the control apparatus and the aerial vehicle. For example, the control apparatus may include a transceiver that may be capable of communicating with a transceiver of the aerial vehicle. The transceivers may permit wireless communications between the aerial vehicle and the control apparatus. In some instances, the communications may include radiofrequency (RF) communications, infrared (IR) communications, WiFi communications, or 3G/4G or other types of telecommunications. The communications may be two-way communications between the control apparatus and the aerial vehicle. For instance, the control apparatus may provide a signal that is sent to the aerial vehicle and controls operation of the aerial vehicle. The aerial vehicle may provide information to the control apparatus, such as information captured by a sensor or payload of the aerial vehicle, or positional information relating to the aerial vehicle. Alternatively, the communications may be a one-way communication from the control apparatus to the aerial vehicle to control the aerial vehicle.

The aerial vehicle 300 may have a flight controller 320. The flight controller may have one or more processors and/or one or more memory units. The processors may be capable of performing one or more step or calculation described herein. The processors may perform the one or more steps in accordance with non-transitory computer readable medium, which include code, logic, or instructions for performing the steps. The memory units may include the non-transitory computer readable medium.

The flight controller 320 may receive a signal from the command receiver 350. This may include a flight control signal. A user using a flight control apparatus 310 may input a flight command, which may be received by the command receiver, which may provide a signal indicative of the flight command to the flight controller. The flight controller may provide instructions to one or more motors 340 (or any other type of actuator) of the aerial vehicle. The instructions to the motors may include output power to drive the motors. The instructions may be generated based on the flight command from the command receiver. The motors may be used to drive one or more propulsion units, such as rotor blades, of the aerial vehicle. The motors may drive the rotor blades of the aerial vehicle to provide lift and/or control flight of the aerial vehicle. In some instances, the power output to the motors may be used to determine whether the aerial vehicle has reached a takeoff threshold.

The aerial vehicle may include one or more inertial sensors 330. An inertial sensor may include an accelerometer, gyroscope, magnetometer, or other type of sensor that may be used to determine a state of the aerial vehicle. The inertial sensor need not receive signals from outside the aerial vehicle. The inertial sensor may generate a signal in response to a detected force on the aerial vehicle. The inertial sensor may provide a signal indicative of an acceleration of the aerial vehicle (e.g., in one, two, or three directions), or angular acceleration of the aerial vehicle (e.g., about one, two, or three axes of rotation). In some instances, the acceleration of the aerial vehicle in a vertical direction may be measured. Measurements from the inertial sensors may be used to determine acceleration (e.g., linear and/or angular) of the aerial vehicle, velocity (e.g., linear and/or angular) or the aerial vehicle, or position (e.g., location and/or orientation) of the aerial vehicle. The inertial sensors may be part of an IMU, or may be provided individually. The inertial sensors may include a three-axis accelerometer and/or a three-axis gyroscope. Alternatively, multiple single or double-axis accelerometers and/or gyroscopes may be used.

Information from the one or more inertial sensors 330 may be sent to the flight controller 320. The flight controller may provide instructions to one or more motors 340 of the aerial vehicle. The instructions may be generated based on the signals from the inertial sensors. In some instances, the information from the inertial sensors may be used to determine whether the aerial vehicle has reached a takeoff threshold. For example, a vertical acceleration of the aerial vehicle measured by the inertial sensors, may be used to determine whether the aerial vehicle has reached a takeoff threshold. The flight controller may consider both the flight command received through the command receiver, and a measurement from an inertial sensor in determining whether a takeoff threshold has been met.

In some instances, information may be provided by a barometer. The barometer may be used to measure ambient pressure around the aerial vehicle. Information from a barometer may optionally be sent to a flight controller. The flight controller may generate one or more signals to a motor based on input from the barometer. The information from the barometer may or may not be used to determine whether the aerial vehicle has reached a takeoff threshold. In some instances, a lower pressure may be indicative of a higher altitude. The barometer may or may not need to be calibrated to the current environmental conditions of the aerial vehicle. In some instances, a change in pressure may be used to determine whether a takeoff threshold has been met, or as part of the information used to determine whether a takeoff threshold has been met. Pressure information may be used in combination or in place of output to motor and/or acceleration of the aerial vehicle.

In one embodiment, a control apparatus 310 may provide a takeoff command to the aerial vehicle 300. The takeoff command may include input from a user of the control apparatus that is indicative of motor speed or power provided to the motor 340. In one example, a user may push a joystick in a direction to correspond to increased or decreased rotational speed of the motor, which may correspond to how quickly the aerial vehicle may ascend or descend. The takeoff command may be received by a command receiver 350 of the aerial vehicle, which may provide information about the takeoff command to a flight controller 320. The flight controller may also receive information from one or more sensors of the aerial vehicle. In some instances, the one or more sensors may include inertial sensors 330. Based on the information received, the flight controller may generate and provide a signal to drive one or more motors of the aerial vehicle.

The flight controller may generate a signal to drive motors of the aerial vehicle in accordance with a first control scheme when a takeoff threshold has not been met, and in accordance with a second control scheme when the takeoff threshold has been met. One or more processors of the flight controller may be used to determine whether the takeoff threshold has been met. The processors of the flight controller may calculate an output to provide to the motors in accordance with the various control schemes. For instance, the flight controller may calculate an output to provide to the motors in response to the command receiver and the inertial sensor in accordance with a first control scheme when the takeoff threshold value has not been reached. The flight controller may calculate an output to provide to the motors in response to the command receiver and the inertial sensor in accordance with a second control scheme when the takeoff threshold value has been reached. In some embodiments, the first control scheme may not include an integral output of zero, while the second control scheme may include a calculated integral output. The flight controller may directly output analog takeoff control values (optionally, without using integral control or having an integral output of zero), and after successful takeoff switch to PID control.

The flight controller may determine, with aid of one or more processors, that a takeoff threshold has been met, based on an output to be provided to the motor. If the output to the motor exceeds an output threshold value, it may be determined that the takeoff threshold has been met. The flight controller may determine that a takeoff threshold has been met based on a signal received by an inertial sensor. For instance, if the vertical acceleration of the aerial vehicle exceeds a threshold acceleration value, it may be determined that the takeoff threshold has been met. In some instances, the flight controller may determine that a takeoff threshold has been met based on a combination of the output to the motor and a signal from an inertial sensor. For instance, the flight controller may determine that a threshold has been met when at least one of the following conditions is true: (1) the vertical acceleration of the aerial vehicle exceeds a threshold acceleration value and the output to the motor exceeds a first threshold output value, or (2) the output to the motor exceeds a second threshold output value. The flight controller may be able to make the determination of whether the takeoff threshold has been met without relying on any information other than the output to the motor and input from the inertial sensor. The flight controller may be able to determine whether the takeoff threshold has been met without relying on any information other than the output to the motor and acceleration (e.g., vertical acceleration) of the aerial vehicle.

The threshold acceleration value and/or threshold output values may be predetermined. In some instances, the threshold values may differ, based on the type of aerial vehicle. For example, a larger or heavier aerial vehicle may have a different threshold output value than a smaller or lighter aerial vehicle. In another example, different aerial vehicles may have different numbers of propulsion units and/or motors with different characteristics. The different aerial vehicles may have different threshold output values from one another. In some instances, threshold acceleration values may remain the same for different types of aerial vehicles, or may differ. The various threshold values may be pre-assigned for different models or types of aerial vehicles. Such threshold values may be pre-programmed on-board the flight controller of the aerial vehicle. Alternatively, the flight controller of the aerial vehicle may access the threshold values from off-board the aerial vehicle. In some instances, the threshold values may be updated. The threshold values may be updated by being sent to the flight controller and being replaced on-board the aerial vehicle. Alternatively, the threshold values may be updated off-board the aerial vehicle and the most recent threshold values may be accessed by the aerial vehicle at the time of use. In some instances, various threshold values for various types of aerial vehicles may be stored in a look-up table or other format. Information about the aerial vehicle type may be used to access the desired threshold values for determining whether a takeoff threshold has been met.

In some instances, an aerial vehicle may have a single motor driving one or more propulsion units. The flight controller may determine the output to the motor and/or use the output to the motor to determine whether a takeoff threshold has been met. In alternate embodiments, multiple motors may be provided, each driving a single propulsion unit or multiple propulsion units. The flight controller may determine output to the multiple motors and/or use the output to the multiple motors to determine whether a takeoff threshold has been met. The flight controller may use the acceleration of the aerial vehicle to determine whether the takeoff threshold has been met.

The flight controller may be able to determine whether the takeoff threshold has been met without requiring any information or signal from a source external to the aerial vehicle. For example, the flight controller may be able to determine whether the takeoff threshold has been met without relying on a GPS signal. The flight controller may also be able to determine whether a takeoff threshold has been met without relying on sensors that require feedback from outside the aerial vehicle (e.g., ultrasonic sensors, ultrawideband (UWB) or other sensors that receive echo waves from outside the vehicle).

Being able to determine whether a takeoff threshold has been met without requiring any external signals may be advantageously permit the aerial vehicle to operate independently of many environmental factors. For example, not requiring a GPS input may permit the aerial vehicle to operate in indoor or outdoor conditions where GPS signals may otherwise be blocked or unreliable. In another example, not requiring feedback from outside the vehicle (e.g., sensors that may require an echo to determine altitude of the aerial vehicle), may diminish risks of interfering signals occurring, or having environmental factors such as moving parts (e.g., leaves blowing in the wind) reducing the reliability of the echoed signal. The systems and methods described herein are also simple and do not require very many complicated calculations that can take more time or processing power. The systems and methods provided herein may provide conditions that may be easily evaluated without performing complex calculations that may be used in systems that look at various relative position and movement information compared to an outside reference.

The systems and methods described herein may permit an aerial vehicle to operate under a first control scheme when taking off, which will reduce likelihood of instability that may occur under traditional control schemes during takeoff. Once it has been determined that the aerial vehicle has sufficiently taken off by meeting a takeoff threshold, the aerial vehicle may switch to a second control scheme for normal flight operations. The aerial vehicle may determine when to switch to the second control scheme based on information that is provided on-board the aerial vehicle without requiring external signals. This may provide a smooth, assisted takeoff for the aerial vehicle in a wide variety of environmental conditions. This may allow more novice users to easily take off by pushing the throttle on a control apparatus. The users may not need to perform more complicated maneuvers during takeoff, which are suited to more experienced users, and which would be more likely required if a typical PID control scheme is used.

The systems, devices, and methods described herein can be applied to a wide variety of movable objects. As previously mentioned, any description herein of an aerial vehicle may apply to and be used for any movable object. Any description herein of an aerial vehicle may apply specifically to UAVs. A movable object of the present disclosure can be configured to move within any suitable environment, such as in air (e.g., a fixed-wing aircraft, a rotary-wing aircraft, or an aircraft having neither fixed wings nor rotary wings), in water (e.g., a ship or a submarine), on ground (e.g., a motor vehicle, such as a car, truck, bus, van, motorcycle, bicycle; a movable structure or frame such as a stick, fishing pole; or a train), under the ground (e.g., a subway), in space (e.g., a spaceplane, a satellite, or a probe), or any combination of these environments. The movable object can be a vehicle, such as a vehicle described elsewhere herein. In some embodiments, the movable object can be carried by a living subject, or take off from a living subject, such as a human or an animal. Suitable animals can include avines, canines, felines, equines, bovines, ovines, porcines, delphines, rodents, or insects.

The movable object may be capable of moving freely within the environment with respect to six degrees of freedom (e.g., three degrees of freedom in translation and three degrees of freedom in rotation). Alternatively, the movement of the movable object can be constrained with respect to one or more degrees of freedom, such as by a predetermined path, track, or orientation. The movement can be actuated by any suitable actuation mechanism, such as an engine or a motor. The actuation mechanism of the movable object can be powered by any suitable energy source, such as electrical energy, magnetic energy, solar energy, wind energy, gravitational energy, chemical energy, nuclear energy, or any suitable combination thereof. The movable object may be self-propelled via a propulsion system, as described elsewhere herein. The propulsion system may optionally run on an energy source, such as electrical energy, magnetic energy, solar energy, wind energy, gravitational energy, chemical energy, nuclear energy, or any suitable combination thereof. Alternatively, the movable object may be carried by a living being.

In some instances, the movable object can be a vehicle. Suitable vehicles may include water vehicles, aerial vehicles, space vehicles, or ground vehicles. For example, aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). A vehicle can be self-propelled, such as self-propelled through the air, on or in water, in space, or on or under the ground. A self-propelled vehicle can utilize a propulsion system, such as a propulsion system including one or more engines, motors, wheels, axles, magnets, rotors, propellers, blades, nozzles, or any suitable combination thereof. In some instances, the propulsion system can be used to enable the movable object to take off from a surface, land on a surface, maintain its current position and/or orientation (e.g., hover), change orientation, and/or change position.

The movable object can be controlled remotely by a user or controlled locally by an occupant within or on the movable object. In some embodiments, the movable object is an unmanned movable object, such as a UAV. An unmanned movable object, such as a UAV, may not have an occupant onboard the movable object. The movable object can be controlled by a human or an autonomous control system (e.g., a computer control system), or any suitable combination thereof. The movable object can be an autonomous or semi-autonomous robot, such as a robot configured with an artificial intelligence.

The movable object can have any suitable size and/or dimensions. In some embodiments, the movable object may be of a size and/or dimensions to have a human occupant within or on the vehicle. Alternatively, the movable object may be of size and/or dimensions smaller than that capable of having a human occupant within or on the vehicle. The movable object may be of a size and/or dimensions suitable for being lifted or carried by a human. Alternatively, the movable object may be larger than a size and/or dimensions suitable for being lifted or carried by a human. In some instances, the movable object may have a maximum dimension (e.g., length, width, height, diameter, diagonal) of less than or equal to about: 2 cm, 5 cm, 10 cm, 50 cm, 1 m, 2 m, 5 m, or 10 m. The maximum dimension may be greater than or equal to about: 2 cm, 5 cm, 10 cm, 50 cm, 1 m, 2 m, 5 m, or 10 m. For example, the distance between shafts of opposite rotors of the movable object may be less than or equal to about: 2 cm, 5 cm, 10 cm, 50 cm, 1 m, 2 m, 5 m, or 10 m. Alternatively, the distance between shafts of opposite rotors may be greater than or equal to about: 2 cm, 5 cm, 10 cm, 50 cm, 1 m, 2 m, 5 m, or 10 m.

In some embodiments, the movable object may have a volume of less than 100 cm×100 cm×100 cm, less than 50 cm×50 cm×30 cm, or less than 5 cm×5 cm×3 cm. The total volume of the movable object may be less than or equal to about: 1 cm$^3$, 2 cm$^3$, 5 cm$^3$, 10 cm$^3$, 20 cm$^3$, 30 cm$^3$, 40 cm$^3$, 50 cm$^3$, 60 cm$^3$, 70 cm$^3$, 80 cm$^3$, 90 cm$^3$, 100 cm$^3$, 150 cm$^3$, 200 cm³, 300 cm³, 500 cm³, 750 cm³, 1000 cm³, 5000 cm³, 10,000 cm³, 100,000 cm³, 1 m³, or 10 m³. Conversely, the total volume of the movable object may be greater than or equal to about: 1 cm³, 2 cm³, 5 cm³, 10 cm³, 20 cm³, 30 cm³, 40 cm³, 50 cm³, 60 cm³, 70 cm³, 80 cm³, 90 cm³, 100 cm³, 150 cm³, 200 cm³, 300 cm³, 500 cm³, 750 cm³, 1000 cm³, 5000 cm³, 10,000 cm³, 100,000 cm³, 1 m³, or 10 m³.

In some embodiments, the movable object may have a footprint (which may refer to the lateral cross-sectional area encompassed by the movable object) less than or equal to about: 32,000 cm², 20,000 cm², 10,000 cm², 1,000 cm², 500 cm², 100 cm², 50 cm², 10 cm², or 5 cm². Conversely, the footprint may be greater than or equal to about: 32,000 cm², 20,000 cm², 10,000 cm², 1,000 cm², 500 cm², 100 cm², 50 cm², 10 cm², or 5 cm².

In some instances, the movable object may weigh no more than 1000 kg. The weight of the movable object may be less than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg. Conversely, the weight may be greater than or equal to about: 1000 kg, 750 kg, 500 kg, 200 kg, 150 kg, 100 kg, 80 kg, 70 kg, 60 kg, 50 kg, 45 kg, 40 kg, 35 kg, 30 kg, 25 kg, 20 kg, 15 kg, 12 kg, 10 kg, 9 kg, 8 kg, 7 kg, 6 kg, 5 kg, 4 kg, 3 kg, 2 kg, 1 kg, 0.5 kg, 0.1 kg, 0.05 kg, or 0.01 kg.

In some embodiments, a movable object may be small relative to a load carried by the movable object. The load may include a payload and/or a carrier, as described in further detail elsewhere herein. In some examples, a ratio of a movable object weight to a load weight may be greater than, less than, or equal to about 1:1. In some instances, a ratio of a movable object weight to a load weight may be greater than, less than, or equal to about 1:1. Optionally, a ratio of a carrier weight to a load weight may be greater than, less than, or equal to about 1:1. When desired, the ratio of an movable object weight to a load weight may be less than or equal to: 1:2, 1:3, 1:4, 1:5, 1:10, or even less. Conversely, the ratio of a movable object weight to a load weight can also be greater than or equal to: 2:1, 3:1, 4:1, 5:1, 10:1, or even greater.

In some embodiments, the movable object may have low energy consumption. For example, the movable object may use less than about: 5 W/h, 4 W/h, 3 W/h, 2 W/h, 1 W/h, or less. In some instances, a carrier of the movable object may have low energy consumption. For example, the carrier may use less than about: 5 W/h, 4 W/h, 3 W/h, 2 W/h, 1 W/h, or less. Optionally, a payload of the movable object may have low energy consumption, such as less than about: 5 W/h, 4 W/h, 3 W/h, 2 W/h, 1 W/h, or less.

Figure 4:
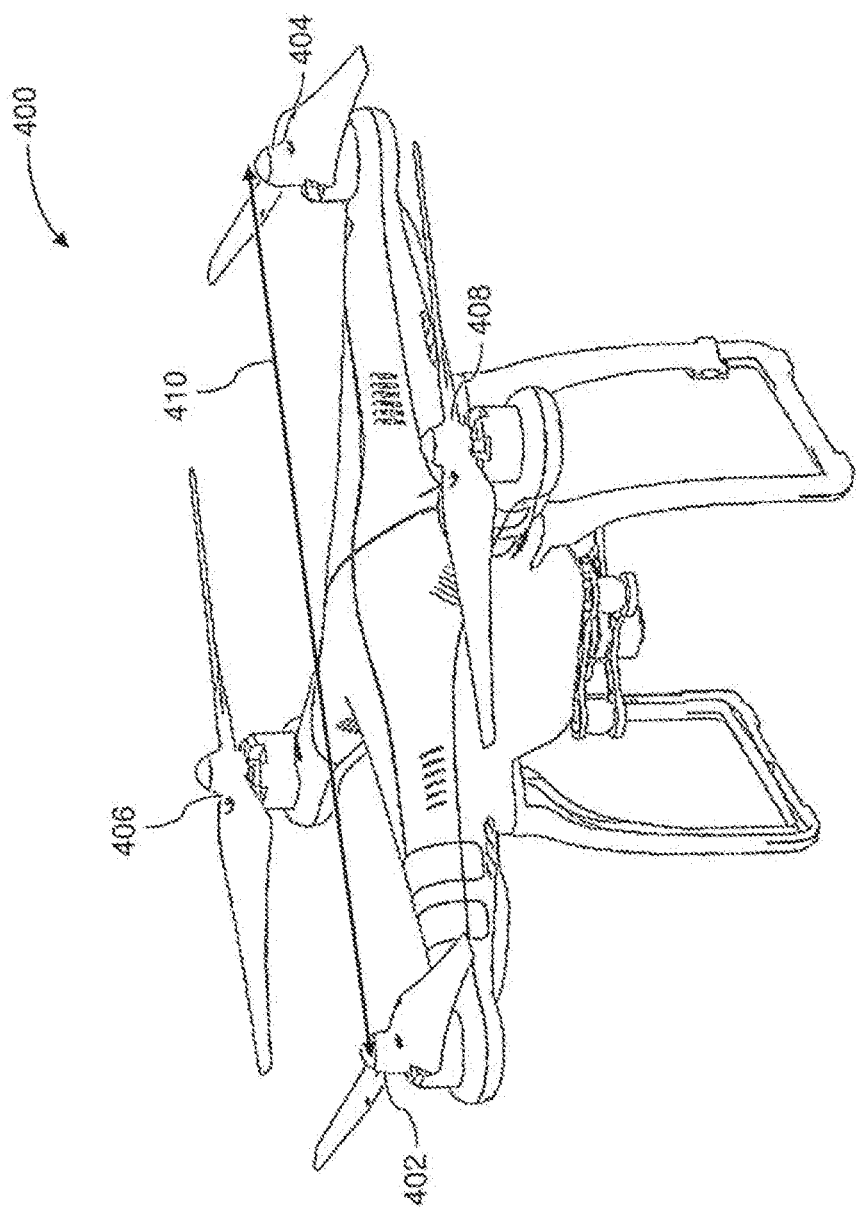
FIG. 4 illustrates an unmanned aerial vehicle, in accordance with an embodiment of the disclosure.

FIG. 4 illustrates an unmanned aerial vehicle (UAV) 400, in accordance with embodiments of the present disclosure. The UAV may be an example of a movable object as described herein. The UAV 400 can include a propulsion system having four rotors 402, 404, 406, and 408. Any number of rotors may be provided (e.g., one, two, three, four, five, six, or more). The rotors, rotor assemblies, or other propulsion systems of the unmanned aerial vehicle may enable the unmanned aerial vehicle to hover/maintain position, change orientation, and/or change location. The distance between shafts of opposite rotors can be any suitable length 410. For example, the length 410 can be less than or equal to 2 m, or less than equal to 11 m. In some embodiments, the length 410 can be within a range from 40 cm to 7 m, from 70 cm to 2 m, or from 11 cm to 11 m. Any description herein of a UAV may apply to a movable object, such as a movable object of a different type, and vice versa. The UAV may use an assisted takeoff system or method as described herein.

In some embodiments, the movable object can be configured to carry a load. The load can include one or more of passengers, cargo, equipment, instruments, and the like. The load can be provided within a housing. The housing may be separate from a housing of the movable object, or be part of a housing for a movable object. Alternatively, the load can be provided with a housing while the movable object does not have a housing. Alternatively, portions of the load or the entire load can be provided without a housing. The load can be rigidly fixed relative to the movable object. Optionally, the load can be movable relative to the movable object (e.g., translatable or rotatable relative to the movable object). The load can include a payload and/or a carrier, as described elsewhere herein.

In some embodiments, the movement of the movable object, carrier, and payload relative to a fixed reference frame (e.g., the surrounding environment) and/or to each other, can be controlled by a terminal. The terminal can be a remote control device at a location distant from the movable object, carrier, and/or payload. The terminal can be disposed on or affixed to a support platform. Alternatively, the terminal can be a handheld or wearable device. For example, the terminal can include a smartphone, tablet, laptop, computer, glasses, gloves, helmet, microphone, or suitable combinations thereof. The terminal can include a user interface, such as a keyboard, mouse, joystick, touchscreen, or display. Any suitable user input can be used to interact with the terminal, such as manually entered commands, voice control, gesture control, or position control (e.g., via a movement, location or tilt of the terminal).

The terminal can be used to control any suitable state of the movable object, carrier, and/or payload. For example, the terminal can be used to control the position and/or orientation of the movable object, carrier, and/or payload relative to a fixed reference from and/or to each other. In some embodiments, the terminal can be used to control individual elements of the movable object, carrier, and/or payload, such as the actuation assembly of the carrier, a sensor of the payload, or an emitter of the payload. The terminal can include a wireless communication device adapted to communicate with one or more of the movable object, carrier, or payload.

The terminal can include a suitable display unit for viewing information of the movable object, carrier, and/or payload. For example, the terminal can be configured to display information of the movable object, carrier, and/or payload with respect to position, translational velocity, translational acceleration, orientation, angular velocity, angular acceleration, or any suitable combinations thereof. In some embodiments, the terminal can display information provided by the payload, such as data provided by a functional payload (e.g., images recorded by a camera or other image capturing device).

Optionally, the same terminal may both control the movable object, carrier, and/or payload, or a state of the movable object, carrier and/or payload, as well as receive and/or display information from the movable object, carrier and/or payload. For example, a terminal may control the positioning of the payload relative to an environment, while displaying image data captured by the payload, or information about the position of the payload. Alternatively, different terminals may be used for different functions. For example, a first terminal may control movement or a state of the movable object, carrier, and/or payload while a second terminal may receive and/or display information from the movable object, carrier, and/or payload. For example, a first terminal may be used to control the positioning of the payload relative to an environment while a second terminal displays image data captured by the payload. Various communication modes may be utilized between a movable object and an integrated terminal that both controls the movable object and receives data, or between the movable object and multiple terminals that both control the movable object and receives data. For example, at least two different communication modes may be formed between the movable object and the terminal that both controls the movable object and receives data from the movable object.

Figure 5:
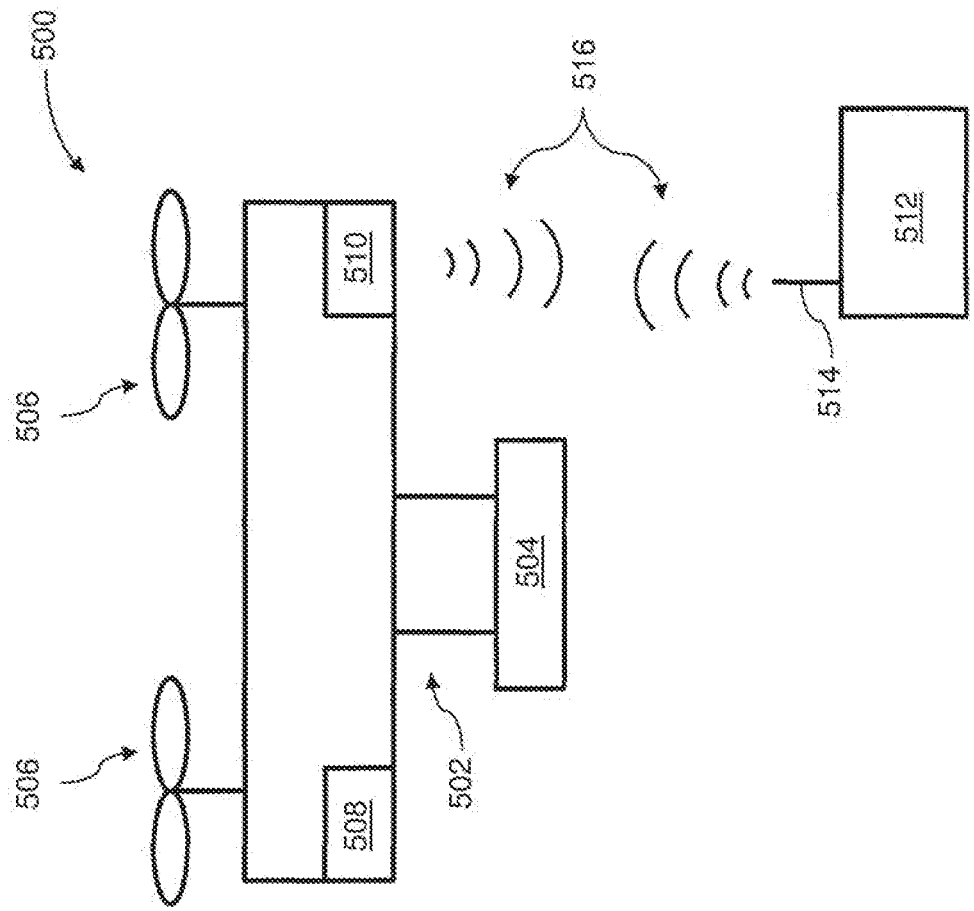
FIG. 5 illustrates a movable object including a carrier and a payload, in accordance with an embodiment of the disclosure.

FIG. 5 illustrates a movable object 500 including a carrier 502 and a payload 504, in accordance with embodiments. Although the movable object 500 is depicted as an aircraft, this depiction is not intended to be limiting, and any suitable type of movable object can be used, as previously described herein. One of skill in the art would appreciate that any of the embodiments described herein in the context of aircraft systems can be applied to any suitable movable object (e.g., an UAV). In some instances, the payload 504 may be provided on the movable object 500 without requiring the carrier 502. The movable object 500 may include propulsion mechanisms 506, a sensing system 508, and a communication system 510.

The propulsion mechanisms 506 can include one or more of rotors, propellers, blades, engines, motors, wheels, axles, magnets, or nozzles, as previously described. The movable object may have one or more, two or more, three or more, or four or more propulsion mechanisms. The propulsion mechanisms may all be of the same type. Alternatively, one or more propulsion mechanisms can be different types of propulsion mechanisms. The propulsion mechanisms 506 can be mounted on the movable object 500 using any suitable means, such as a support element (e.g., a drive shaft) as described elsewhere herein. The propulsion mechanisms 506 can be mounted on any suitable portion of the movable object 500, such on the top, bottom, front, back, sides, or suitable combinations thereof.

In some embodiments, the propulsion mechanisms 506 can enable the movable object 500 to take off vertically from a surface or land vertically on a surface without requiring any horizontal movement of the movable object 500 (e.g., without traveling down a runway). Optionally, the propulsion mechanisms 506 can be operable to permit the movable object 500 to hover in the air at a specified position and/or orientation. One or more of the propulsion mechanisms 500 may be controlled independently of the other propulsion mechanisms. Alternatively, the propulsion mechanisms 500 can be configured to be controlled simultaneously. For example, the movable object 500 can have multiple horizontally oriented rotors that can provide lift and/or thrust to the movable object. The multiple horizontally oriented rotors can be actuated to provide vertical takeoff, vertical landing, and hovering capabilities to the movable object 500. In some embodiments, one or more of the horizontally oriented rotors may spin in a clockwise direction, while one or more of the horizontally rotors may spin in a counterclockwise direction. For example, the number of clockwise rotors may be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 500 (e.g., with respect to up to three degrees of translation and up to three degrees of rotation).

The sensing system 508 can include one or more sensors that may sense the spatial disposition, velocity, and/or acceleration of the movable object 500 (e.g., with respect to up to three degrees of translation and up to three degrees of rotation). The one or more sensors can include global positioning system (GPS) sensors, motion sensors, inertial sensors, proximity sensors, or image sensors. The sensing data provided by the sensing system 508 can be used to control the spatial disposition, velocity, and/or orientation of the movable object 500 (e.g., using a suitable processing unit and/or control module, as described below). Alternatively, the sensing system 508 can be used to provide data regarding the environment surrounding the movable object, such as weather conditions, proximity to potential obstacles, location of geographical features, location of manmade structures, and the like.

The communication system 510 enables communication with terminal 512 having a communication system 514 via wireless signals 516. The communication systems 510, 514 may include any number of transmitters, receivers, and/or transceivers suitable for wireless communication. The communication may be one-way communication, such that data can be transmitted in only one direction. For example, one-way communication may involve only the movable object 500 transmitting data to the terminal 512, or vice-versa. The data may be transmitted from one or more transmitters of the communication system 510 to one or more receivers of the communication system 512, or vice-versa. Alternatively, the communication may be two-way communication, such that data can be transmitted in both directions between the movable object 500 and the terminal 512. The two-way communication can involve transmitting data from one or more transmitters of the communication system 510 to one or more receivers of the communication system 514, and vice-versa.

In some embodiments, the terminal 512 can provide control data to one or more of the movable object 500, carrier 502, and payload 504 and receive information from one or more of the movable object 500, carrier 502, and payload 504 (e.g., position and/or motion information of the movable object, carrier or payload; data sensed by the payload such as image data captured by a payload camera). In some instances, control data from the terminal may include instructions for relative positions, movements, actuations, or controls of the movable object, carrier and/or payload. For example, the control data may result in a modification of the location and/or orientation of the movable object (e.g., via control of the propulsion mechanisms 506), or a movement of the payload with respect to the movable object (e.g., via control of the carrier 502). The control data from the terminal may result in control of the payload, such as control of the operation of a camera or other image capturing device (e.g., taking still or moving pictures, zooming in or out, turning on or off, switching imaging modes, change image resolution, changing focus, changing depth of field, changing exposure time, changing viewing angle or field of view). In some instances, the communications from the movable object, carrier and/or payload may include information from one or more sensors (e.g., of the sensing system 508 or of the payload 504). The communications may include sensed information from one or more different types of sensors (e.g., GPS sensors, motion sensors, inertial sensor, proximity sensors, or image sensors). Such information may pertain to the position (e.g., location, orientation), movement, or acceleration of the movable object, carrier and/or payload. Such information from a payload may include data captured by the payload or a sensed state of the payload. The control data provided transmitted by the terminal 512 can be configured to control a state of one or more of the movable object 1200, carrier 1202, or payload 504. Alternatively or in combination, the carrier 502 and payload 504 can also each include a communication module configured to communicate with terminal 512, such that the terminal can communicate with and control each of the movable object 500, carrier 502, and payload 504 independently.

In some embodiments, the movable object 500 can be configured to communicate with another remote device in addition to the terminal 512, or instead of the terminal 512. The terminal 512 may also be configured to communicate with another remote device as well as the movable object 500. For example, the movable object 500 and/or terminal 512 may communicate with another movable object, or a carrier or payload of another movable object. When desired, the remote device may be a second terminal or other computing device (e.g., computer, laptop, tablet, smartphone, or other mobile device). The remote device can be configured to transmit data to the movable object 500, receive data from the movable object 500, transmit data to the terminal 512, and/or receive data from the terminal 512. Optionally, the remote device can be connected to the Internet or other telecommunications network, such that data received from the movable object 500 and/or terminal 512 can be uploaded to a website or server.

Figure 6:
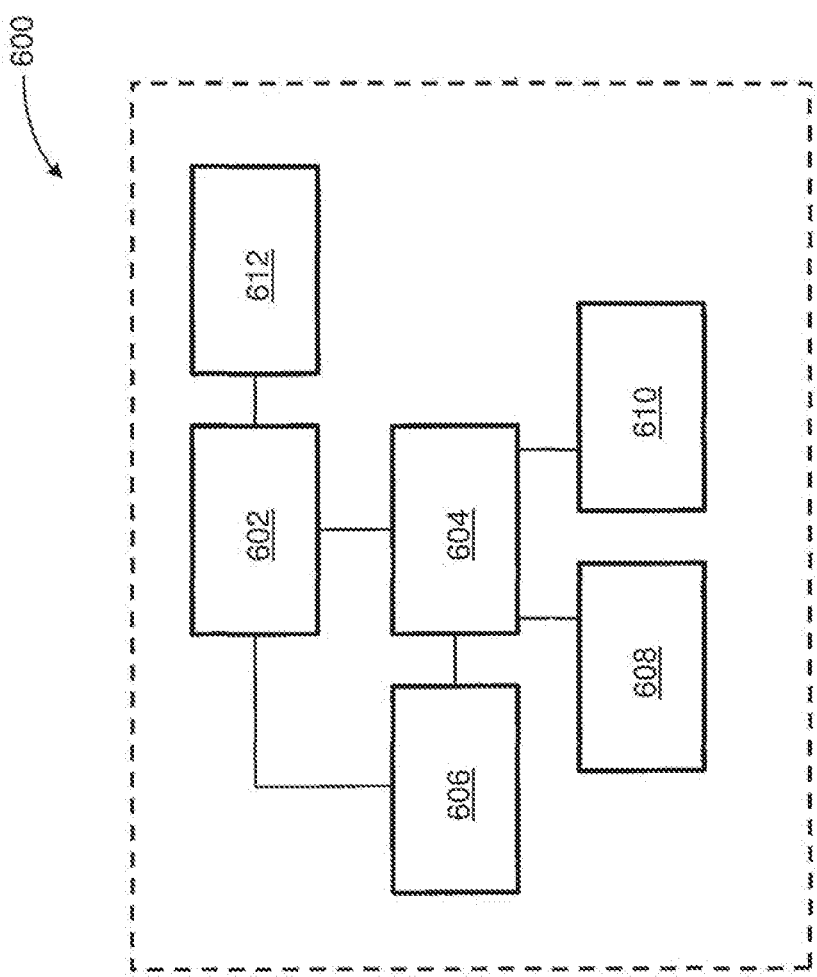
FIG. 6 is a schematic illustration by way of block diagram of a system for controlling a movable object, in accordance with an embodiment of the disclosure.

FIG. 6 is a schematic illustration by way of block diagram of a system 600 for controlling a movable object, in accordance with embodiments. The system 600 can be used in combination with any suitable embodiment of the systems, devices, and methods disclosed herein. The system 600 can include a sensing module 602, processing unit 604, non-transitory computer readable medium 606, control module 608, and communication module 610.

The sensing module 602 can utilize different types of sensors that collect information relating to the movable objects in different ways. Different types of sensors may sense different types of signals or signals from different sources. For example, the sensors can include inertial sensors, GPS sensors, proximity sensors (e.g., lidar), or vision/image sensors (e.g., a camera). The sensing module 602 can be operatively coupled to a processing unit 604 having a plurality of processors. In some embodiments, the sensing module can be operatively coupled to a transmission module 612 (e.g., a Wi-Fi image transmission module) configured to directly transmit sensing data to a suitable external device or system. For example, the transmission module 612 can be used to transmit images captured by a camera of the sensing module 602 to a remote terminal.

The processing unit 604 can have one or more processors, such as a programmable processor (e.g., a central processing unit (CPU)). The processing unit 604 can be operatively coupled to a non-transitory computer readable medium 606. The non-transitory computer readable medium 606 can store logic, code, and/or program instructions executable by the processing unit 604 for performing one or more steps. The non-transitory computer readable medium can include one or more memory units (e.g., removable media or external storage such as an SD card or random access memory (RAM)). In some embodiments, data from the sensing module 602 can be directly conveyed to and stored within the memory units of the non-transitory computer readable medium 606. The memory units of the non-transitory computer readable medium 606 can store logic, code and/or program instructions executable by the processing unit 604 to perform any suitable embodiment of the methods described herein. For example, the processing unit 604 can be configured to execute instructions causing one or more processors of the processing unit 604 to analyze sensing data produced by the sensing module. The memory units can store sensing data from the sensing module to be processed by the processing unit 604. In some embodiments, the memory units of the non-transitory computer readable medium 606 can be used to store the processing results produced by the processing unit 604.

In some embodiments, the processing unit 604 can be operatively coupled to a control module 608 configured to control a state of the movable object. For example, the control module 608 can be configured to control the propulsion mechanisms of the movable object to adjust the spatial disposition, velocity, and/or acceleration of the movable object with respect to six degrees of freedom. Alternatively or in combination, the control module 608 can control one or more of a state of a carrier, payload, or sensing module.

The processing unit 604 can be operatively coupled to a communication module 610 configured to transmit and/or receive data from one or more external devices (e.g., a terminal, display device, or other remote controller). Any suitable means of communication can be used, such as wired communication or wireless communication. For example, the communication module 610 can utilize one or more of local area networks (LAN), wide area networks (WAN), infrared, radio, WiFi, point-to-point (P2P) networks, telecommunication networks, cloud communication, and the like. Optionally, relay stations, such as towers, satellites, or mobile stations, can be used. Wireless communications can be proximity dependent or proximity independent. In some embodiments, line-of-sight may or may not be required for communications. The communication module 610 can transmit and/or receive one or more of sensing data from the sensing module 602, processing results produced by the processing unit 604, predetermined control data, user commands from a terminal or remote controller, and the like.

The components of the system 600 can be arranged in any suitable configuration. For example, one or more of the components of the system 600 can be located on the movable object, carrier, payload, terminal, sensing system, or an additional external device in communication with one or more of the above. Additionally, although FIG. 6 depicts a single processing unit 604 and a single non-transitory computer readable medium 606, one of skill in the art would appreciate that this is not intended to be limiting, and that the system 600 can include a plurality of processing units and/or non-transitory computer readable media. In some embodiments, one or more of the plurality of processing units and/or non-transitory computer readable media can be situated at different locations, such as on the movable object, carrier, payload, terminal, sensing module, additional external device in communication with one or more of the above, or suitable combinations thereof, such that any suitable aspect of the processing and/or memory functions performed by the system 600 can occur at one or more of the aforementioned locations.

While some embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A method of assisted takeoff of a movable object comprising:
increasing output to an actuator that drives a propulsion unit of the movable object under a first feedback control scheme, the first feedback control scheme being configured to result in a proportional-derivative control for a vertical or a lateral direction of the movable object;
determining, with aid of a processor, whether the movable object has met a takeoff threshold; and
controlling the output to the actuator using a second feedback control scheme different from the first feedback control scheme in response to the movable object having met the takeoff threshold, the second feedback control scheme being configured to result in a proportional-integral-derivative control for the vertical or the lateral direction of the movable object.

2. The method of claim 1, wherein the movable object is an aircraft capable of vertically taking off and/or landing.

3. The method of claim 1, wherein determining whether the movable object has met the takeoff threshold is based on at least one of the output to the actuator, the output measured from the actuator, a velocity of the movable object, or an acceleration of the movable object.

4. The method of claim 1, wherein determining whether the aerial vehicle has met the takeoff threshold is performed without using signals from a source external to the aerial vehicle or using signals reflected to the aerial vehicle.

5. The method of claim 1, further comprising:
receiving a command from a remote terminal to increase the altitude of the movable object.

6. The method of claim 1, wherein the first feedback control scheme has an integral value of zero.

7. The method of claim 1, wherein the second feedback control scheme has an integral value that is not zero.

8. The method of claim 1, wherein the first feedback control scheme results in the proportional-derivative control for the vertical direction of the movable object, and the second feedback control scheme results in the proportional-integral-derivative control for the lateral direction of the movable object.

9. A method of assisted takeoff of a movable object comprising:
controlling the movable object using a first feedback control scheme, the first feedback control scheme being configured to result in a proportional-derivative control for a vertical or a lateral direction of the movable object;
determining, with aid of a processor, whether the movable object has met a takeoff threshold based on at least one of a velocity of the movable object or an acceleration of the movable object; and
controlling the movable object using a second feedback control scheme different from the first feedback control scheme in response to the movable object having met the takeoff threshold, the second feedback control scheme being configured to result in a proportional-integral-derivative control for the vertical or the lateral direction of the movable object.

10. The method of claim 9, wherein the movable object is determined to have met the takeoff threshold in response to the acceleration of the movable object in a vertical direction exceeding a predetermined acceleration value.

11. The method of claim 9, wherein the movable object is an unmanned aerial vehicle including a plurality of rotors configured to generate lift for the unmanned aerial vehicle.

12. The method of claim 9 wherein the movable object is determined to have met the takeoff threshold in response to the acceleration of the movable object in a vertical direction exceeding a predetermined acceleration value and an output to an actuator of the movable object being greater than a predetermined output value.

13. The method of claim 12, wherein the output to the actuator is determined based on command signals from a flight controller or measured using one or more sensors.

14. A system for assisted takeoff of a movable object comprising:
an actuator of the movable object, an output to the actuator driving a propulsion unit of the movable object; and
one or more processors, individually or collectively configured to:
determine whether the movable object has met a takeoff threshold, and
generate a signal used to control the output to the actuator using:
a first feedback control scheme in response to the movable object having not met the takeoff threshold, the first feedback control scheme being configured to result in a proportional-derivative control for a vertical or a lateral direction of the movable object; and
a second feedback control scheme different from the first feedback control scheme in response to the movable object having met the takeoff threshold, the second feedback control scheme being configured to result in a proportional-integral-derivative control for the vertical or the lateral direction of the movable object.

15. The system of claim 14, wherein the movable object is an unmanned aerial vehicle comprising a plurality of rotors configured to generate lift for the unmanned aerial vehicle.

16. The system of claim 14, wherein the one or more processors are configured to determine whether the movable object has met the takeoff threshold based on at least one of the output to the actuator, the output measured from the actuator, a velocity of the movable object, or an acceleration of the movable object.

17. The system of claim 14, wherein the one or more processors are further configured to determine whether the aerial vehicle has met the takeoff threshold without using signals from a source external to the aerial vehicle or using signals reflected to the aerial vehicle.

18. The system of claim 14, wherein the one or more processors are further configured to determine whether the movable object has met the takeoff threshold based on the output to the actuator or the output measured from the actuator.

* * * * *